(12) United States Patent
Kelkar et al.

(10) Patent No.: US 7,941,746 B2
(45) Date of Patent: May 10, 2011

(54) EXTENDED CASCADING STYLE SHEETS

(75) Inventors: Amol Shrikrishna Kelkar, Redmond, WA (US); James Arthur Horne, Bellevue, WA (US); Ryan Parsell, Puyallup, WA (US)

(73) Assignee: Microsoft Corporation, Redmond, WA (US)

( * ) Notice: Subject to any disclaimer, the term of this patent is extended or adjusted under 35 U.S.C. 154(b) by 894 days.

(21) Appl. No.: 11/776,426

(22) Filed: Jul. 11, 2007

(65) Prior Publication Data

US 2009/0019378 A1    Jan. 15, 2009

(51) Int. Cl.
*G06N 3/00* (2006.01)
(52) U.S. Cl. ....................................... 715/235
(58) Field of Classification Search .................. 715/234, 715/243, 254, 235
See application file for complete search history.

(56) References Cited

U.S. PATENT DOCUMENTS

| | | |
|---|---|---|
| 6,613,098 B1 | 9/2003 | Sorge et al. |
| 6,957,394 B1 | 10/2005 | Fernandez et al. |
| 7,013,289 B2 | 3/2006 | Horn et al. |
| 2001/0044809 A1 | 11/2001 | Parasnis et al. |
| 2004/0046789 A1 | 3/2004 | Inanoria |
| 2004/0199622 A1 | 10/2004 | Huscher et al. |
| 2004/0205588 A1 | 10/2004 | Purvis et al. |
| 2006/0010374 A1 | 1/2006 | Corrington et al. |
| 2006/0101038 A1 | 5/2006 | Gabriel et al. |
| 2006/0242557 A1 | 10/2006 | Nortis, III |
| 2008/0189240 A1 * | 8/2008 | Mullins et al. .................. 707/2 |

OTHER PUBLICATIONS

Badros, G. J. et al., "Constraint Cascading Style Sheets for the Web", http://www.badros.com/greg/papers/css-uist99.pdf, 10 pages.
Bry, F. et al., "Adaptive Hypermedia Made Simple Using HTML / XML Style Sheet Selectors", http://www.pms.ifi.lmu.de/publikationen/PMS-FB/PMS-FB-2002-1.pdf, 11 pages.
"Theme Support", http://qooxdoo.org/documentation/0.7/theme_support, Manual vol. 7, 12 pages, printed from http://www.pms.ifi.lmu.de/publikationen/projektarbeiten/Christoph.Wieser/fogra.pdf, printed on Apr. 21. 2007.
Wieser, C., "Toward Extending Stylesheet Languages with Dynamic Document Rendering Features", http://www.pms.ifi.lmu.de/publikationen/projektarbeiten/Christoph.Wieser/fopra.pdf, Dec. 8, 2005, 48 pages, Germany.

* cited by examiner

*Primary Examiner* — Kyle R Stork
(74) *Attorney, Agent, or Firm* — Senniger Powers LLP

(57) ABSTRACT

A CSSX (Extended Cascading Style Sheets) file including non-CSS (Cascading Style Sheet) extensions is used to define and reference variables and inheritance sets. A CSSX file compiler determines a value of the defined variable, modifies the CSSX file by replacing all references to the defined variable with the value, and generates the CSS file from the modified CSSX file. The inheritance set is defined in the CSSX file and includes a reference to a previously defined CSS rule set. The CSSX file compiler defines a new CSS rule set as a function of the determined attributes included in the previously defined CSS rule set of the defined inheritance set and generates the CSS file including the newly defined CSS rule set.

13 Claims, 3 Drawing Sheets

EXTENDED CASCADING STYLE SHEETS

BACKGROUND

Cascading Style Sheet (CSS) is a stylesheet language used to describe the presentation of a document written in a markup language (e.g., HTML or XHTML). CSS most common application is to style web pages, but the language can be applied to any kind of XML document. The CSS specifications are maintained by the World Wide Web Consortium.

Traditionally, CSS (Cascading Style Sheets) have been authored with little emphasis on cross-product code sharing. CSSs for each product have been self-contained and isolated. When a set of web products want to use a common set of user interface guidelines, each product team would implement the guidelines (with varying interpretations and coverage) in its own CSSs thereby duplicating efforts and making it harder for the user interface guidelines to evolve.

For example, web products often want to implement themeing. Themeing allows developers to have the ability to apply a given theme (a set of text color, background color, background images, etc) to any or all products. The CSS standard's model is not adequate to represent such a system due to the lack of support for variables and inheritance. A few product teams have used server-side technologies to inject variables into CSS. However, that approach makes CSS considerably harder to author and localize because the system is restricted in the types of modifications it can make to CSS generation and there is no consistent way for defining, accessing and overriding theme resources like images.

Additionally, localizing CSS is an expensive process where product CSS is given to localizers and they modify and return localized CSS. Examples of localized CSS styles include fonts, text sizes, colors, and text styles (e.g., italics, bold). In general, the localizer often modifies CSS without actually seeing the output and the actual product testing happens after the CSS is handed back to the product team. This makes the process error prone, time consuming and expensive.

SUMMARY

Embodiments of the invention include extensions to the CSS (Cascading Style Sheet) language. In an embodiment, a CSSX (Extended Cascading Style Sheets) file including CSSX extensions defining a variable and CSSX extensions for referencing the variable is created. A CSSX file compiler determines a value of the defined variable, modifies the CSSX file by replacing references to the defined variable with the value, and generates the CSS file from the modified CSSX file.

According another aspect, the CSSX file includes a definition for a left variable with a value of left and a right variable with a value of right. The CSSX file compiler generates a right-to-left CSS file by determining if a specified language reads left-to-right or right-to-left. If the specified language reads right-to-left the right variable is redefined with a value of left and the left variable is redefined with a value of right. The CSSX file compiler generates the CSS file that will automatically render a right-to-left layout in the web browser.

According yet to another aspect of the invention, the CSSX file includes CSSX extensions for defining an inheritance set. The inheritance set is defined in the CSSX file and includes a reference to a previously defined CSS rule set. The CSSX file compiler defines a new CSS rule set as a function of the determined attributes included in the previously defined CSS rule set of the defined inheritance set and generates the CSS file including the newly defined CSS rule set.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

In an embodiment, the invention includes extensions to the CSS (Cascading Style Sheet) language. In particular, the invention includes systems and methods for defining variables and inheritance sets using extensions to the CSS standard language.

Figure 1:
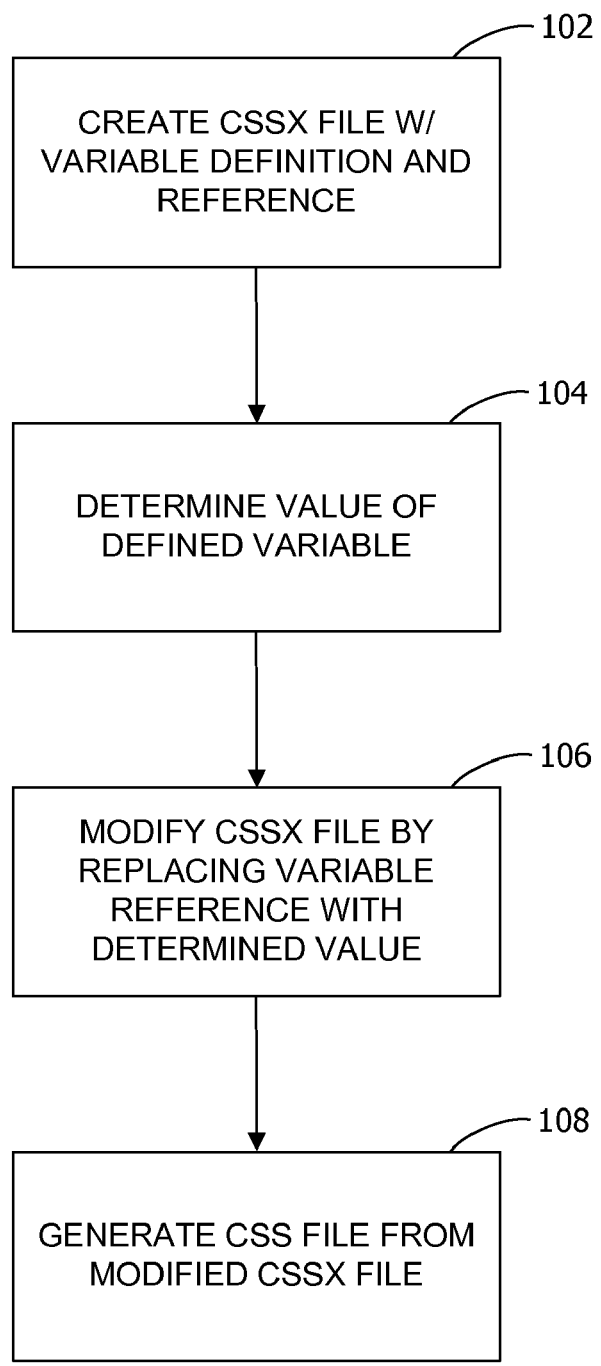
FIG. 1 is an exemplary flow chart illustrating a method for creating a CSS file from a CSSX file which includes CSSX extensions for defining a variable using CSS extensions.
Figure 3:
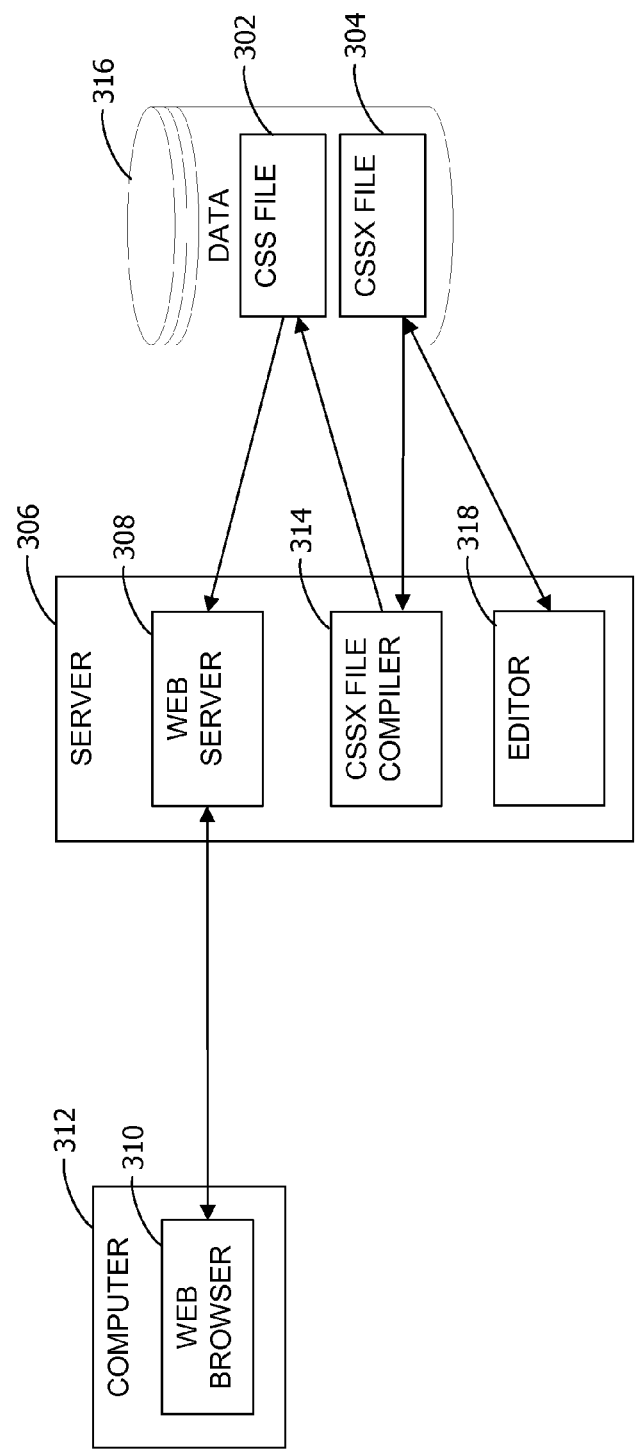
FIG. 3 is a block diagram illustrating one example of a suitable computing system environment in which the invention may be implemented.

Referring to FIGS. 1 and 3, an embodiment of a method as shown in FIG. 1 for creating a CSS file 302 from a CSSX (Extended Cascading Style Sheets) file 304 including CSSX extensions (e.g., non-CSS extensions) for defining a variable as shown in FIG. 3 is illustrated. The CSSX file includes CSSX extensions. According to aspects of the invention, the CSSX extensions are not part of the CSS standard. The CSS file 302 is intended for execution by a web browser 310 that does not execute CSSX extensions. Additionally, the web browser 310 does not execute the variable definitions of the CSSX file 304.

At 102, the CSSX file 304 is created. In an embodiment, the CSSX file 304 is a text file that may be created by a text editor. The CSSX file 304 includes CSSX extensions defining a variable and CSSX extensions for referencing the variable. In an embodiment, the variable is defined using a CSS style rule with a non-CSS compatible name. For example, the variable can be defined by using a style rule with name "#define" where "#define {Color1:red;}" defines the variable named "Color1" with a value "red". Additionally, in another embodiment, the variable can be referenced in the CSSX file 304 by putting a "?" in front of the variable name. For example, "MyClass {color:?Color1; }" would get interpreted as "MyClass {color:red;}" if Color1 was defined as red. Furthermore, multiple variables can be defined in a single #define block (i.e., #define {Color1: red; Color2: blue;}) and a variable's value may be any string of text terminated by a semicolon (i.e., #define {SomeText: This is value of the SomeText variable;} and #define {ContainerBackgroundImage: url (img/a.gif);}).

At 104, a CSSX file compiler 314 determines the value of the defined variable in the CSSX file 304. And, at 106, the CSSX file compiler 314 modifies the CSSX file 304 by replacing references to the defined variable with the value determined at step 104. In an embodiment, a whole CSS term or part of a CSS term may be replaced by the reference to the variable. For example, the following code in the CSSX file 304 define {Side:right;}/* defines variable 'Side' with value 'right'*/MyClass {border-?Side:1px solid red;} would be result in the CSS file 302 as

MyClass {border-right: 1px solid red;}

At 108, the CSSX file compiler 314 generates the CSS file 302 from the modified CSSX file 304. The CSS file 302 does not include the variable definition, but includes the replaced variable value. Thus, the CSS file 302 contains only CSS compatible commands and no CSSX extensions.

For example, if a specific style value (e.g., color value) is used in multiple rules in the CSS file 302, all the instances have to specify that style value explicitly. There is no support for defining and referencing the variable in standard CSS. For example, suppose in a page there is one element whose background color must be the same as another element's border color, shown in the following CSS code example:

Style 1 {background-color:blue;}
Style2 {border-color:blue;}

Now if the color needs to be changed from blue to red, then it needs to be changed in both the rules above. There is no syntax in CSS to indicate that the "blue" value in these two styles must remain in sync. Such code quickly becomes hard to maintain and it is advantageous to define and reference a variable whose value would change from "blue" to "red" and all code instances would use the variable instead of using the color directly.

For example, the styles may defined using the following CSS extension code:

define {Color1:blue;}
Style1 {background-color:Color1;}
Style2 {border-color:Color1;}

Now, to change blue to red, only the variable definition needs to be changed:

define {Color1: red;}
Style1 {background-color: Color1;}
Style2 {border-color:Color1;}

In an embodiment, when multiple definitions for a single variable are present in the CSSX file 304, at step 104, the CSSX file compiler 314 assigns the last defined variable value as the determined value of the variable.

In another embodiment, the method allows for automatic right-to-left processing of the CSSX file 304. A right-to-left language is written and read right-to left such that the writings of the language begin at a right-hand side of a page and concludes at a left-hand side. For example, right-to-left languages include Arabic and Hebrew. A left-to-right language is written and read left-to right such that the writings of the language begin at a left-hand side of a page and concludes at a right-hand side. For example, left-to-right languages include languages which use the Latin alphabet.

In this embodiment, a left variable with a value of left and a right variable with a value of right are defined. In one embodiment, the left and right variables are defined in the CSSX file 304. Alternatively, the left and right variables are defined by the CSSX file compiler 314 and may be referenced in a CSSX file 304 without being previously defined in the CSSX file 304.

At least the left variable or the right variable is referenced in the CSSX file 304. Additionally, a language is specified within the CSSX file 304. Alternatively, the CSSX file compiler 314 may determine the language from a parameter of a client (e.g., web browser 310 or computer 312). The parameter includes a client locale or a client designation.

The CSSX file compiler 314 determines if the specified language reads left-to-right or right-to-left. If the specified language reads right-to-left, the CSSX file compiler 314 redefines the right variable with a value of left and the left variable with a value of right. Thus, the CSSX file compiler 314 automatically generates the CSS file 302 from the CSSX file 304 that will render a right-to-left layout in the web browser 310 when the language reads right-to-left. The CSS file 302 does not include the left or right variable definition, but includes the replaced variable values. Thus, the CSS file 302 contains only CSS compatible commands and no CSS extensions.

Figure 2:
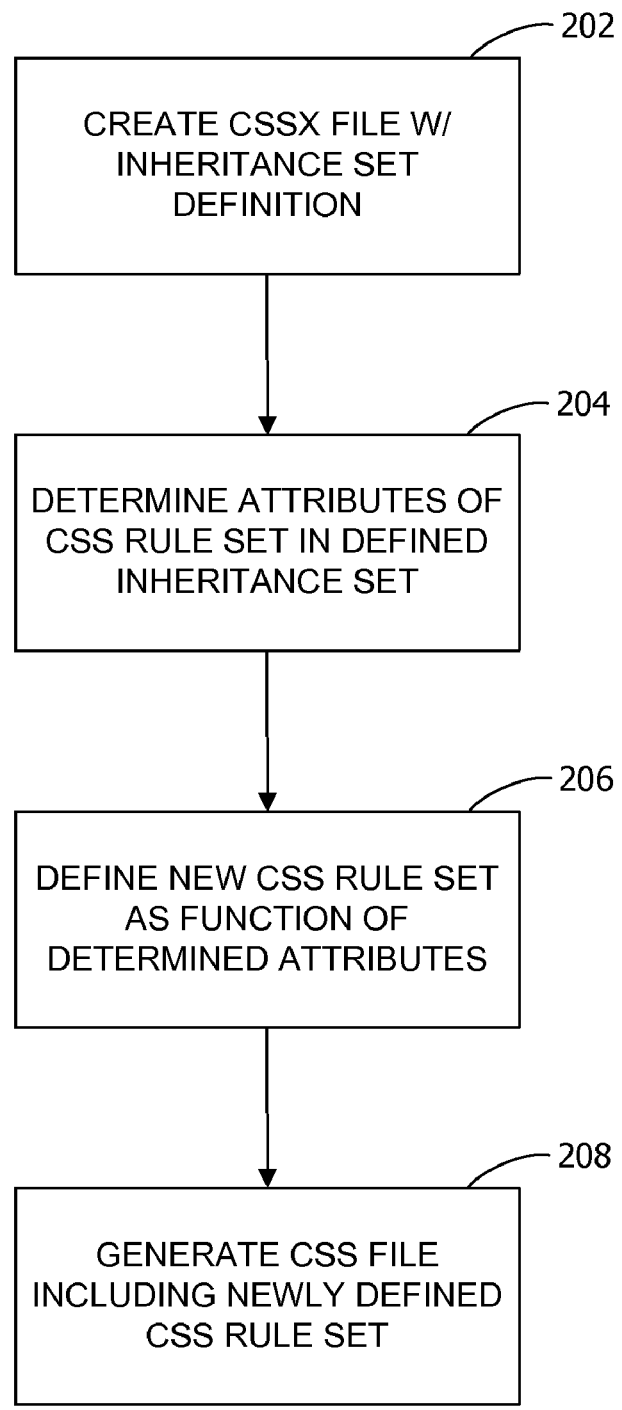
FIG. 2 is an exemplary flow chart illustrating a method for creating a CSS file from a CSSX file which includes CSSX extensions for defining an inheritance set using CSS extensions.

FIG. 2 illustrates an embodiment for a method for creating a CSS file 302 from a CSSX file 304 including CSSX extensions for defining an inheritance set. The CSS file 302 is intended for use with a web browser 310 that does not execute CSSX extensions and would not execute the defined inheritance set. The inheritance set differs from the cascading effects of CSS. For example, in CSS, when a rule is applied to a multi-nested list, many CSS rules (e.g., font sizes) will cascade to elements further down the nested list. In contrast, the CSSX extensions for defining an inheritance set creates a new CSS rule set from previously defined CSS rule sets and/or inline CCS styles.

At 202, the CSSX file 304 is created including a CSSX extension (e.g., non-CSS extensions) for defining the inheritance set. The definition of the inheritance set includes a reference to a previously defined CSS rule set. And, at 204, the CSSX file compiler 314 determines the attributes of the previously defined CSS rule set included in the definition of the inheritance set of the CSSX file 304. For example, the following CSSX file 304:

MyClass1 {border:1px solid red;}
MyClass2 {color:green;}
MyClass3 {inherit:MyClass1; margin:0px; inherit:MyClass2;} defines the inheritance set MyClass3 using attributes from previously defined classes, MyClass1 and MyClass2.

At 206, the CSSX file compiler 314 defines a new CSS rule set as a function of the determined attributes included in the previously defined CSS rule set of the defined inheritance set. Alternatively, the defined inheritance set includes references to multiple previously defined CSS rule sets. And, the newly created CSS rule set is defined as a function of the determined attributes included in all of the previously defined CSS rule sets of the defined inheritance set. For example, from the CSSX file above, the following CSS file 302 will be created:

MyClass1 {border:1px solid red;}
MyClass2 {color:green;}
MyClass3 {border: 1px solid red; margin:0px; color: green;}

In yet another alternative, the defined inheritance set includes a reference to an inline CSS style and the inline CSS style takes precedence over the determined attributes of the previously defined CSS rule set when defining the new CSS rule set. For example, the following CSSX file 304:

MyClass 1 {margin:1px; border:1px solid red}
MyClass2 {color:green;}
MyClass3 {inherit:MyClass1; margin:0px; inherit:MyClass2;} will generate the following CSS file 302:

MyClass1 {margin:1px solid red;}
MyClass2 {color:green;}
MyClass3 {border:1px solid red; margin:0px; color: green;}

In a fourth alternative embodiment, the defined inheritance set includes a reference to a previously defined CSS rule set including a pseudo class and the defined new CSS rule set includes the pseudo class. For example, the following CSSX file 304:
    MyClass1 {color:red;}
    MyClass1:hover {color:blue;}
    div.MyClass1 {color:green;}
    MyClass2 {margin:1px; inherit:MyClass1;}
    will generate the following CSS file 302:
    MyClass1 {color:red;}
    MyClass1:hover {color:blue;}
    div.MyClass1 {color:green;}
    MyClass2 {margin:1px; color:red;}
    MyClass2:hover {margin:1px; color:blue;}
    div.MyClass2 {margin:1px; color:green;}

At 208, the CSSX file compiler 314 generates the CSS file 302. The CSS file 302 does not include the definition for the inheritance set, but includes the newly defined CSS rule set. Thus, the CSS file 302 contains only CSS compatible commands and no CSS extensions.

FIG. 3 illustrates an embodiment of a system for generating the CSS file 302 from the CSSX file 304. The CSSX file 304 includes one or more non-compatible CSS extensions used to generate the CSS file 302. In an embodiment, a server 306 includes a web server component 308 for serving the generated CSS files 302 to the web browser 310 executing on a computer 312. The web browser 310 requests the CSS file 302 stored on a storage device 316 accessible to the web server 308. The web browser 310 renders the CSS file 302 on a display and is only able to render CSS files 302 containing only CSS compatible commands and is not able to render CSS files 302 containing CSS extensions.

In an embodiment, the computer 312 and the server 306 are connected through a network. The server 306 and computer 312 may operate in a networked environment using logical connections to one or more remote computers. The remote computer may be a personal computer, a server, a router, a network PC, a peer device or other common network node, and typically includes many or all of the elements described above relative to server 306 and computer 312. The logical connections depicted in FIG. 3 include a local area network (LAN) and a wide area network (WAN), but may also include other networks. LAN and/or WAN may be a wired network, a wireless network, a combination thereof, and so on. Such networking environments are commonplace in offices, enterprise-wide computer networks, intranets, and global computer networks (e.g., the Internet).

The server 306 also includes the CSSX file compiler 314 for generating the CSS file 302 from the CSSX file 304 and the storage device 316 for storing the CSSX file 304 and the CSS file 302. In an embodiment, the CSSX file compiler 314 is a two-pass compiler where variables and values are gathered during the first pass of the CSSX file and the gathered values are substituted for variable during the second pass. The generated CSS file 302 contains only CSS compatible commands and no CSS extensions. In an embodiment, the web server 308 may access the area of the storage device 316 containing the CSS file 302 and the CSSX file compiler 314 may access the area of the storage device 316 containing the CSS file 302 and the CSSX file 304.

In another embodiment, the CSSX file 304 includes CSSX extensions for defining at least one variable and at least one CSSX extensions for referencing the variable. The CSSX file compiler 314 determines the value of the defined variable and modifies the CSSX file 304 by replacing all references to the defined variable with the determined value. The CSSX file compiler 314 generates the CSS file 302 from the modified CSSX file 304. The generated CSS file 302 does not include the variable; instead the CSS file 302 includes the replaced variable value. Furthermore, the CSS file 302 contains only CSS compatible commands and no CSSX extensions. In an embodiment, CSSX file compiler 314 uses the longest variable name available when resolving conflicts. For example if two variables are defined in the CSSX file 304:
    #define {MyWid:3; MyWidth:20;}
    then the following reference in the CSSX file 304
    MyClass {width:?MyWidthpx;}
    would get interpreted as in the CSS file 302
    MyClass {width:20px;}
    and not as
    MyClass {width:3px;}

In yet another embodiment, the CSSX file 304 includes a definition for a left variable with a value of left and a right variable with a value of right, a reference to at least the defined left variable or the defined right variable, and a language specifier. The CSSX file compiler 314 determines if the specified language reads left-to-right or right-to-left. If the specified language reads right-to-left, the CSSX file compiler 314 redefines the right variable with a value of left and the left variable with a value of right in the CSSX file 304. The CSSX file compiler 314 generates the CSS file 302 from the CSSX file 304. The CSS file 302 does not include the variable definition, but it includes the replaced variable value. Thus, the CSS file 302 contains only CSS compatible commands and no CSS extensions. Advantageously, by switching the values of the left and right variable when the language specifier indicates the language reads right-to-left, the generated CSS file 302 will automatically render a right-to-left layout in the web browser 310. In an embodiment, the language is specified by a parameter of the web browser 310 such as the web browser locale or the web browser designation.

Alternatively, the CSSX file 304 includes a CSSX extension for defining an inheritance set including a reference to the previously defined CSS rule set. The CSSX file compiler 314 determines the attributes of the previously defined CSS rule set included in the definition of the inheritance set and defines a new CSS rule set as a function of the determined attributes included in the previously defined CSS rule set. The CSSX file compiler 314 generates the CSS file 302 including the newly defined CSS rule set, but not the definition for the inheritance set. The generated CSS file 302 contains only CSS compatible commands and no CSS extensions.

In an embodiment, the defined inheritance set includes a reference to an inline CSS style. The inline CSS style takes precedence over the determined attributes of the previously defined CSS rule set when defining the new CSS rule set.

In yet another embodiment, the system includes an editor 318 for creating the CSSX file including CSS extensions and standard CSS. The editor 318 provides components to create the CSSX file and modify the CSSX file. Additionally, the editor 318 includes syntax for the CSS extensions and for the standard CSS in the CSSX file. For example, the editor 318 allows a user to create and maintain a CSSX file including CSS extensions and standard CSS without having to learn completely new syntax for creating the CSSX file.

FIG. 3 shows one example of a general purpose computing device in the form of a computer (e.g., server 306 and computer 312). In one embodiment of the invention, a computer such as the computer (e.g., server 306 and computer 312) is suitable for use in the other figures illustrated and described herein. The computer (e.g., server 306 and computer 312) typically has at least some form of computer readable media. Computer readable media, which include both volatile and nonvolatile media, removable and non-removable media, may be any available medium that may be accessed by computer (e.g., server 306 and computer 312). By way of example and not limitation, computer readable media comprise computer storage media and communication media.

Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer (e.g., server 306 and computer 312).

Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The computer (e.g., server 306 and computer 312) may also include other removable/non-removable, volatile/nonvolatile computer storage media. For example, FIG. 3 illustrates the storage device 316 that includes removable/non-removable, volatile/nonvolatile computer storage media that may be used in the exemplary operating environment include, but are not limited to a hard disk, a magnetic disk, a optical disk, magnetic tape cassettes, flash memory cards, digital versatile disks, digital video tape, solid state RAM, solid state ROM, and the like. The drives or other mass storage devices and their associated computer storage media discussed above and illustrated in FIG. 3, provide storage of computer readable instructions, data structures, program modules and other data for the computer (e.g., server 306 and computer 312).

In a networked environment, program modules depicted relative to computer (e.g., server 306 and computer 312), or portions thereof, may be stored in a remote memory storage device (not shown). The network connections shown are exemplary and other means of establishing a communications link between the computers may be used.

For purposes of illustration, programs and other executable program components are illustrated herein as discrete blocks. It is recognized, however, that such programs and components reside at various times in different storage components of the computer, and are executed by the data processor(s) of the computer (e.g., server 306 and computer 312).

Although described in connection with an exemplary computing system environment, including computer (e.g., server 306 and computer 312), embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method for creating a CSS (cascading style sheet) file from a CSSX (Extended Cascading Style Sheets) file including CSSX extensions for defining a variable, said CSS file intended for execution by a web browser that does not execute CSSX extensions wherein the web browser would not execute the variables of the CSSX file including the CSSX extensions, said method comprising:

creating the CSSX file including CSSX extensions for defining a variable and CSSX extensions for referencing said variable, wherein said creating comprises:

defining a left variable with a value of left and a right variable with a value of right;
referencing at least the left variable or the right variable in the CSSX file; and
specifying a language within the CSSX file;
determining a value of the defined variable in the CSSX file;
modifying the CSSX file by replacing all references to the defined variable with the determined value; and
generating from the modified CSSX file the CSS file not including the variable and including the replaced variable value wherein the CSS file contains only CSS compatible commands and wherein the CSS file contains no CSSX extensions, wherein said generating comprises:
determining if the specified language reads left-to-right or right-to-left;
if the specified language reads right-to-left, redefining the right variable with a value of left and the left variable with a value of right; and
generating from the specified CSSX file the CSS file not including the variable definition and including the replaced variable value wherein the CSS file contains only CSS compatible commands and wherein the CSS file contains no CSS extensions whereby the CSS file will automatically render a right-to-left layout in the web browser when the language reads right-to-left.

2. The method of claim 1, wherein multiple definitions for a single variable are present in the CSSX file, and said determining comprises assigning the last defined variable value as the determined value of the variable.

3. The method of claim 1, wherein a whole CSS term or part of a CSS term may be replaced by a reference to the variable.

4. The method of claim 1, wherein the variable is defined using a CSS style rule with a non-CSS compatible name.

5. The method of claim 1, wherein the language is specified by a parameter of a client wherein the parameter includes client locale or client designation.

6. The method of claim 1, wherein the language is written and read right-to left such that the writings of the language begin at a right-hand side of a page and concludes at a left-hand side.

7. The method of claim 1, wherein the language is a right-to-left language and includes at least one of the following: Arabic and Hebrew.

8. The method of claim 1, wherein the language is written and read left-to right such that the writings of the language begin at a left-hand side of a page and concludes at a right-hand side.

9. The method of claim 1, wherein the language is a left-to-right language and includes languages with use the Latin alphabet.

10. A method for creating a CSS file from a CSSX file including CSSX extensions for defining an inheritance set, said CSS file intended for use with a web browser that does not execute CSSX extensions wherein the web browser would not execute the defined inheritance set of the CSSX file including the CSSX extensions, comprising:
creating the CSSX file including a CSSX extensions for defining the inheritance set including a reference to a previously defined CSS rule set, wherein said creating comprises specifying a non-computer language within the CSSX file for display in the web browser;
determining the attributes of the previously defined CSS rule set included in the definition of the inheritance set;
defining a new CSS rule set as a function of the determined attributes included in the previously defined CSS rule set of the defined inheritance set; and
generating the CSS file not including the definition for the inheritance set and including the newly defined CSS rule set wherein the CSS file contains only CSS compatible commands and wherein the CSS file contains no CSS extensions, whereby the generated CSS file will automatically render a right-to-left layout in the web browser when the non-computer language reads right-to-left.

11. The method of claim 10, wherein the defined inheritance set includes references to multiple previously defined CSS rule sets and the newly created CSS rule set is defined as a function of the determined attributes included in all of the previously defined CSS rule sets of the defined inheritance set.

12. The method of claim 10, wherein the defined inheritance set includes a reference to an inline CSS style and wherein the inline CSS style takes precedence over the determined attributes of the previously defined CSS rule set when defining the new CSS rule set.

13. The method of claim 10, wherein the defined inheritance set includes a reference to a previously defined CSS rule set including a pseudo class and the defined new CSS rule set includes said pseudo class.

* * * * *